(12) United States Patent
Ilias et al.

(10) Patent No.: US 7,731,203 B2
(45) Date of Patent: Jun. 8, 2010

(54) METHOD FOR LOAD-DEPENDENT AIR QUALITY CONTROL IN A PNEUMATIC SPRING SYSTEM

(75) Inventors: Heike Ilias, Wedemark (DE); Uwe Folchert, Lauenau (DE)

(73) Assignee: Continental Aktiengesellschaft, Hannover (DE)

( * ) Notice: Subject to any disclaimer, the term of this patent is extended or adjusted under 35 U.S.C. 154(b) by 435 days.

(21) Appl. No.: 11/631,684

(22) PCT Filed: May 24, 2005

(86) PCT No.: PCT/EP2005/052358

§ 371 (c)(1),
(2), (4) Date: Jan. 5, 2007

(87) PCT Pub. No.: WO2006/005645

PCT Pub. Date: Jan. 19, 2006

(65) Prior Publication Data

US 2007/0251575 A1 Nov. 1, 2007

(30) Foreign Application Priority Data

Jul. 10, 2004 (DE) .................. 10 2004 033 524

(51) Int. Cl.
*B60G 17/00* (2006.01)
(52) U.S. Cl. ............... 280/6.159; 280/124.157; 267/64.28
(58) Field of Classification Search .......... 280/6.153, 280/6.157, 6.159, 5.514, 124.157–124.161; 267/64.28
See application file for complete search history.

(56) References Cited

U.S. PATENT DOCUMENTS 4,354,693 A * 10/1982 Maeda et al. ............ 267/64.21

(Continued)

FOREIGN PATENT DOCUMENTS

JP 01 293211 11/1989

*Primary Examiner*—Paul N Dickson
*Assistant Examiner*—Drew Brown

(57) ABSTRACT

According to a method for controlling the air volume in a closed pneumatic spring system of a vehicle, an air-powered pump supplies at least two pneumatic springs and/or a compressed air reservoir with a specific air volume as needed such that the air pressure prevailing in the respective pneumatic spring and/or the compressed air reservoir is at a level which causes a vehicle body resting on the pneumatic spring to be positioned at a desired distance from the roadway or the vehicle axle. In order to obtain largely constant control velocities at different load conditions of the vehicle while using a smaller compressed air reservoir than in previously known systems, the pneumatic spring pressure (P) is measured in at least two of the pneumatic springs, the distance (HN, NN, TN) of the vehicle body to the roadway or the vehicle axle is determined, the axle load (AL) of at least one vehicle axle is determined from the pneumatic spring pressure (P) and the distance (HN, NN, TN) of the vehicle body to the roadway or the vehicle axle, a target system air volume (PV_SOLL) is determined in accordance with the respective axle load (AL), and the actual system air volume is adjusted to said target system air volume by actuating the air-powered pump or a relief valve.

11 Claims, 1 Drawing Sheet

U.S. PATENT DOCUMENTS

| | | | |
|---|---|---|---|
| 4,858,895 A * | 8/1989 | Buma et al. | 267/64.16 |
| 5,794,924 A * | 8/1998 | Stolpp | 267/64.11 |
| 6,173,974 B1 * | 1/2001 | Raad et al. | 280/6.157 |
| 6,189,903 B1 * | 2/2001 | Bloxham | 280/124.16 |
| 6,266,590 B1 * | 7/2001 | Kutscher et al. | 701/37 |
| 6,523,845 B2 * | 2/2003 | Stiller | 280/124.16 |
| 6,685,174 B2 * | 2/2004 | Behmenburg et al. | 267/64.28 |
| 6,874,772 B2 * | 4/2005 | Oldenettel | 267/64.28 |
| 6,935,625 B2 * | 8/2005 | Bolt et al. | 267/64.16 |
| 6,959,932 B2 * | 11/2005 | Svartz et al. | 280/5.514 |
| 7,192,012 B2 * | 3/2007 | Bolt et al. | 267/64.16 |
| 7,255,358 B2 * | 8/2007 | Kim | 280/124.16 |
| 2002/0166321 A1 | 11/2002 | Oldenettel | |

* cited by examiner

METHOD FOR LOAD-DEPENDENT AIR QUALITY CONTROL IN A PNEUMATIC SPRING SYSTEM

BACKGROUND OF THE INVENTION

The invention relates to a method for air quantity control in a closed pneumatic spring system in a vehicle, in which method a compressed air pump supplies at least two pneumatic springs and/or a compressed air store on demand with an air quantity of such a magnitude that a high air pressure prevails in the respective pneumatic spring and/or in the compressed air store such that a vehicle body which is supported on the pneumatic spring is at a desired distance from the underlying surface or from the vehicle axle.

It is generally known that pneumatic springs in motor vehicles can be utilized to adjust the height of the vehicle body relative to the underlying surface and to maintain a selected distance to the underlying surface under different vehicle loading. For this purpose, pneumatic springs of said type are arranged at least one vehicle axle, between the latter and the body, and are connected to a compressed air source via compressed air lines. The respective pneumatic springs are adjusted on the basis of suitable items of sensor information which are processed by an open-loop and closed-loop control unit to form adjustment signals for valves arranged in the compressed air lines.

It is known from EP 0 779 167 B1 with regard to a level controlling device that the air quantity in the pneumatic spring bellows determines the height of the vehicle body above the vehicle axle, so that said distance can be changed by adjusting said air quantity. Since the pressure, volume and temperature of a gas are linked to one another in a known way by the gas laws, a change in the air quantity in a pneumatic spring bellows for a constant volume of the bellows results in a change in the air pressure in said bellows, which effects a change in level. In the level controlling device known from said document, it is provided inter alia that the air pressure measured in the pneumatic spring bellows for a constant vehicle level can be utilized as a measure of the loading of the vehicle, the mean value of the measured pressure values of the pneumatic springs of a vehicle axle preferably being utilized.

Level control systems of said type are to some extent designed as closed systems in which a compressed air store can be pressurized with a nominal air pressure by means of a compressed air pump. In closed compressed air systems of said type, the pneumatic springs are conventionally supplied with compressed air from the compressed air reservoir of the compressed air store. The compressed air pump fills the compressed air store in a discontinuous fashion whenever the system air quantity falls below a minimum limit value.

Overall, a closed compressed air system of said type contains a certain system air quantity which is to be considered constant during uninterrupted operation. Changes in the system air quantity are to be attributed, for example, to leaks in the system and/or to temperature changes. If the system air quantity falls below a predetermined nominal value, this can generally also be identified as a pressure loss as a result of which the compressed air pump is activated until the nominal value of the system air quantity is again enclosed in the compressed air system.

In order that the described controlling process is not triggered in the event of every small deviation from the nominal value of the system air quantity, controlling processes of said type provide an air quantity tolerance band whose upper and lower limit values, like the nominal value of the system air quantity according to the prior art, are predetermined constant variables for all level controlling and vehicle loading states.

Against this background, a method for controlling the pressure in the compressed air store in a closed level control system is known from DE 101 22 567 C1. The level control system there has a compressor and a compressed air store which can be filled with air from the atmosphere and can be discharged to the atmosphere. At least one pneumatic spring is additionally provided which is connected to the compressed air store via the compressor in such a way that compressed air can be conveyed from the pneumatic spring into the compressed air store and vice versa.

According to said document, a method for controlling the store pressure of the compressed air store should be used in the described level control system, said method ensuring that the store pressure is in a certain range and that the compressed air store is not unnecessarily filled with compressed air from the atmosphere or discharged to the atmosphere.

In a certain state of the motor vehicle, the store pressure should preferably be in a certain range in order to ensure fast lifting and lowering of the vehicle body. In this context, it is provided that the store pressure of the compressed air store is controlled indirectly by means of the determination of the air quantity in the level control system. Here, the compressed air store is filled with air from the atmosphere when the air quantity is below a limit, and is discharged to the atmosphere when the air quantity is above an upper limit. Said control is carried out in such a way that the actual air quantity in the system after filling or discharging is in a working range between the upper and lower limits.

According to said document, it is preferably also provided that the air quantity is always kept in a certain working range and, as a result, the store pressure is also in a certain pressure range in the certain state of the vehicle. Here, the working range for the air quantity is preferably selected such that, in a certain normal state of the vehicle, the store pressure is in a range in which both fast lifting and fast lowering of the vehicle body is possible.

Although a controlling method of said type is functional, it has proven to be disadvantageous that, for all level and loading states, comparatively large differences can be detected in the required controlling times for different level and loading states, in particular as a result of the constant nominal air quantity value and as a result of the fixed air quantity tolerance band. In addition, there is a trade-off in the control of the extreme states "controlled lowering at empty load" and "controlled lifting at full load". Finally, controlling processes which operate in such a way require a comparatively large compressed air store, which has an adverse effect on the production costs of a generic level control system.

Against this background, the invention is based on the problem of proposing a method for the open-loop and closed-loop control of a level control system, with which method constant controlling speeds are possible in all vehicle loading states. Said method should additionally be suitable for allowing the smallest possible pressure store to be used.

SUMMARY OF THE INVENTION in that the pneumatic spring pressure is measured in at least two of the pneumatic springs, in that the distance from the vehicle body to the underlying surface or to the vehicle axle is determined, in that the axle load of the respective vehicle axle is determined from the pneumatic spring pressure and the distance from the vehicle body to the underlying surface or to the vehicle axle, and in that a nominal system air quantity value is determined as a function of the axle load, the actual system air quantity being adjusted to said nominal system air quantity value by actuating the compressed air pump or by actuating a relief valve.

The invention is based on the realization that the problem of interest can be solved if the nominal system air quantity value of the level control system is variably adapted as a function of the loading state of the vehicle. A further improvement can be obtained if the limit values of the air quantity tolerance band are also determined as a function of loading.

Accordingly, the invention proceeds from a method for air quantity control in a closed pneumatic spring system in a vehicle, in which method a compressed air pump supplies at least two pneumatic springs and/or a compressed air store on demand with an air quantity of such a magnitude that a high air pressure prevails in the respective pneumatic spring and/or in the compressed air store such that a vehicle body which is supported on the pneumatic spring is at a desired distance from the underlying surface or from the vehicle axle.

To solve the problem of interest, it is additionally provided that the pneumatic spring pressure is measured in at least two of the pneumatic springs of a vehicle axle, that the distance from the vehicle body to the underlying surface or to the vehicle axle is determined, that the axle load of at least one vehicle axle is determined from the pneumatic spring pressure and the distance from the vehicle body to the underlying surface or to the vehicle axle, and that a nominal system air quantity value is determined as a function of the respective axle load or of the vehicle loading state, the actual system air quantity being adjusted to said nominal system air quantity value by actuating the compressed air pump or by actuating a relief valve.

Using said approach, the nominal system air quantity value is determined as a function of loading, resulting in a similar controlling speed under different loading states of the vehicle.

According to one preferred variant of said method, it is provided that the respective nominal system air quantity value is assigned an air quantity tolerance band whose upper tolerance band limit value does not exceed a predetermined maximum system air quantity value, and whose lower tolerance band limit value does not fall below a predetermined minimum system air quantity value. The tolerance band can also be of different width as a function of the respective loading state of the vehicle. Here, however, it is ensured that the air quantity in the compressed air system does not exceed or fall below respective maximum and minimum values.

According to another embodiment of the invention, it can be provided that the difference between the nominal system air quantity value and the upper tolerance band limit value and the difference between the nominal system air quantity value and the lower tolerance band limit value are of different magnitude. The method rule makes it possible for the value of the nominal air quantity value, which is to be set as a function of the load weight, to be brought very close to said maximum value or minimum value for the system air quantity.

Against said background, it is also possible with certain restrictions for the nominal system air quantity value to coincide with the upper tolerance band limit value or with the lower tolerance band limit value, so that the tolerance band extends in only one direction, specifically the direction of higher or lower system air quantity values. Regardless of this, it is however preferable for a tolerance band to be present in both directions, even if said tolerance band is to be only relatively small in one direction.

As a special case under said boundary conditions, it can be provided that the nominal system air quantity value is identical to the maximum system air quantity value or the minimum system air quantity value.

The invention preferably also encompasses the method boundary condition that the maximum system air quantity value, the minimum system air quantity value and the upper and lower tolerance band limit values are selected such that the controlling speed is higher than a defined speed limit value in all level change processes which occur during operation.

According to another method boundary condition, it is preferably provided that the maximum system air quantity value, the minimum system air quantity value and the upper and lower tolerance band limit values are selected such that a maximum permitted electrical current consumption of the compressed air pump is not exceeded in all level change processes which occur during operation.

A further method boundary condition is characterized in that the maximum system air quantity value, the minimum system air quantity value and the upper and lower tolerance band limit values are selected such that the pressure in the compressed air store does not fall below a predetermined minimum value and the pressure in the compressed air store does not exceed a maximum predetermined value in all level change processes which occur during operation.

The method according to the invention is preferably utilized to control the air quantity of a pneumatic spring system and/or level control system whose pneumatic springs are arranged in the region of the axial ends of at least two vehicle axles. With a so-called 4-corner level control system of said type, not only is it possible to maintain a set distance from the vehicle body to the underlying surface, but such a system also permits the vehicle level to be adjusted independently of the loading state of the vehicle.

It is however also possible to utilize said method to control the air quantity of a pneumatic spring system or level control system whose adjustable pneumatic springs are arranged only in the region of the axial ends of a rear vehicle axle.

According to a final variant of the invention, it is provided that the current nominal system air quantity value and the current limit values of the air quantity tolerance band are determined while the vehicle is at rest. On the one hand, this saves computing time in the utilization of an open-loop and closed-loop control unit provided for this purpose, and on the other hand, the result desired by the invention is not impaired since loading and unloading processes generally take place while the vehicle is at rest.

In addition, pneumatic spring pressure measurements can be carried out while the vehicle is traveling for the purpose of cyclically determining the system air quantity. In this way, it can be determined whether the system air quantity is within the air quantity tolerance band.

The method according to the invention and some embodiments relating thereto are explained in more detail in the following on the basis of the appended drawing.

DETAILED DESCRIPTION OF THE DRAWINGS

Figure 1:
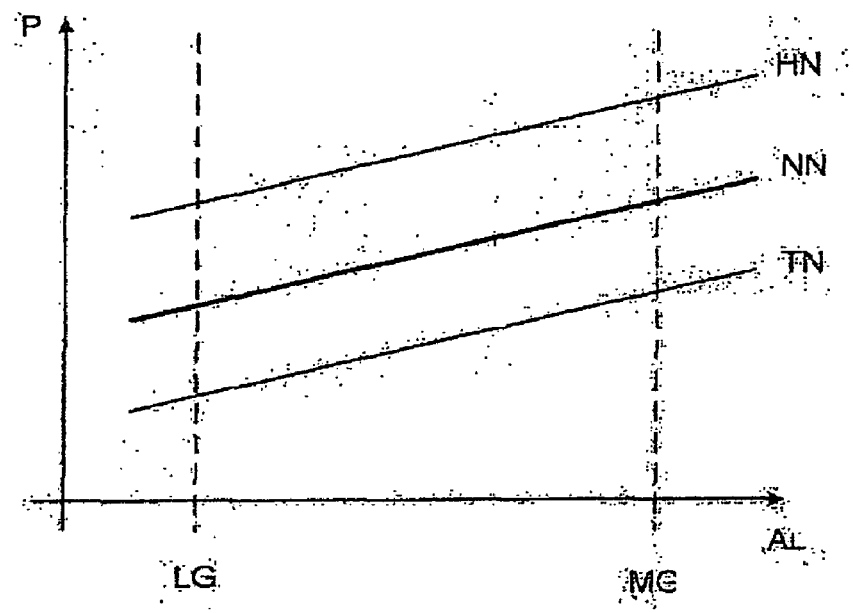
FIG. 1 shows a diagram in which the pneumatic spring pressure is plotted as a function of an axle load of a vehicle.

The diagram illustrated in FIG. 1 illustrates the dependence of the pneumatic spring pressure P on the axle load AL of a vehicle axle. The vehicle considered here by way of example is a motor vehicle having a 4-corner pneumatic spring system which has a closed air supply and with which, in addition to load equalization, level adjustment of the vehicle body can also be carried out at both vehicle axles within a certain adjustment range. The limits of said adjustment range are selected so as to be at a distance from a straight line NN which characterizes the normal vehicle level, and are formed by the straight line HN for a high vehicle level and by the straight line TN for a low vehicle level.

Once a vehicle level (straight line HN, HH or TN) has been set, the air pressure P in the pneumatic springs of said vehicle varies as a function of the axle load AL between a value LG which characterizes the vehicle empty weight and a value MG which indicates the permissible total weight.

As FIG. 1 shows, the air pressure P in each pneumatic spring of the vehicle varies approximately linearly as a function of the axle load AL or of the loading state BZ of the vehicle. The axle load AL of each vehicle axle can therefore be inferred by measuring the pneumatic spring pressures at all four pneumatic springs at the ends of the two vehicle axles and by measuring the vehicle level HN, NN, TN in terms of a distance measurement, for example, between the vehicle body and the underlying surface or the respective vehicle axle.

A pressure measurement of said type is generally possible in all vehicle level positions and also while the vehicle is traveling. Said pressure measurements are however preferably carried out to determine the vehicle loading state or the respective axle load AL only when the vehicle is actually being loaded. This is normally the case when the vehicle is stationary.

The individual load-dependent pneumatic spring pressures P are added up axle-by-axle, to form axle loads, on the basis of the functional relationship illustrated in FIG. 1. Said axle weight is equivalent to the loading state BZ of the vehicle. Since load changes are primarily perceivable in the pressures of the rear axle, it is generally sufficient in a 4-corner pneumatic spring system to consider only the pneumatic springs of the rear axle. The pressure values of the front axle can, however, be additionally taken into consideration for the purpose of plausibility checking.

A design air quantity or a nominal system air quantity value PV_SOLL can then be determined from the value for the current loading state BZ. This is carried out on the basis of a value table which is stored in an open-loop and closed-loop control unit which is provided for this purpose, or on the basis of a mathematical function. A mathematical function of said type has a linear dependency, as per FIG. 2. As said figure shows, the loading state of the vehicle is specified here with qualitative values, including "empty", "current" and "full". The loading state BZ can, however, be specified by means of the vehicle total weight instead of said qualitative values, the weight of the unloaded, unoccupied and fueled vehicle being set as the lowest value, while the highest value can be defined by the highest permissible total vehicle weight.

A current optimum nominal air quantity value for the vehicle is then determined using a loading state BZ of said vehicle which is determined in this way. In the example shown in FIG. 2, the vehicle has a loading state with the value "current" which is assigned the loading-dependent nominal air quantity value PV_SOLL. Here, in contrast to the prior art, said nominal air quantity value PV_SOLL is not a constant value for all level and loading states. Moreover, said nominal air quantity value PV_SOLL is dependent on the loading state BZ of the vehicle and can also have an upper air quantity limit value PV_MAX or a lower air quantity limit value PV_MIN which should not, however, be crossed.

However, the nominal air quantity value PV_SOLL is preferably assigned a tolerance band TL with an upper limit value PV_OG and a lower limit value PV_UG which, for example, are spaced apart from the nominal air quantity value PV_SOLL to an equal degree. The difference between the two limit values PV_OG and PV_UG is preferably determined as a function of the loading state of the vehicle determined according to the method. Here, it is not strictly prescribed that the two limit values PV_OG and PV_UG are spaced apart from the nominal air quantity value PV_SOLL to an equal degree.

In the previously described cases in which the nominal air quantity value PV_SOLL is at the upper air quantity limit value PV_MAX, the upper half of the tolerance band TL can be reduced to zero, while the lower half of said tolerance band TL remains. If the nominal air quantity value PV_SOLL is identical to the lower air quantity limit value PV_MIN, the lower tolerance limit value PV_UG accordingly has the value zero.

As already mentioned in the introduction, however, there should always be a tolerance band in both directions from the nominal air quantity value PV_SOLL for optimum operation of the pneumatic spring system, so that even small temperature fluctuations or tolerances in the compressed air system do not immediately lead to air quantity equalization.

Figure 2:
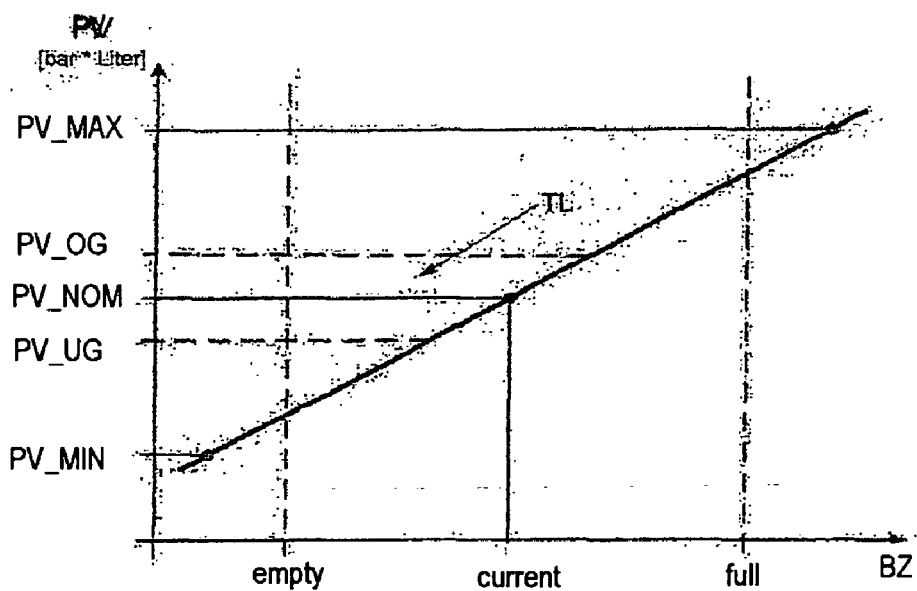
FIG. 2 shows a diagram in which the air quantity is illustrated as a function of the loading state of the vehicle.

As shown in FIG. 2, the difference between the nominal air quantity value PV_SOLL and the upper limit value PV_OG or the lower limit value PV_UG of the tolerance band TL is preferably also determined such that when the loading state BZ of the vehicle reaches the "full" or "empty" value, the upper limit value PV_OG or the lower limit value PV_UG of the tolerance band TL corresponds respectively to the upper air quantity limit value PV_MAX or the lower air quantity limit value PV_MIN.

The loading-dependent nominal air quantity value PV_SOLL which is determined in this way, and preferably also the limit values of the tolerance band TL, are determined by an open-loop and closed-loop control unit for example cyclically and/or whenever the vehicle is stationary. Should the actual system air quantity lie outside the tolerance band TL for the current loading state BZ at that time, this is to be attributed to relatively large temperature changes and/or leakage. In this case, compressed air is supplied to the compressed air system by means of the compressed air pump, or is discharged from said compressed air system by actuating a pressure relief valve, until the loading-dependent nominal air quantity value PV_SOLL is reached.

The method according to the invention can however also be utilized for level controlling devices which have a closed air supply and in which only one controlling function for maintaining a vehicle level, which is set once, is implemented for the purpose of providing a normal level or driving level.

The method according to the invention is also distinguished in said application in that an at least approximately identical controlling speed can be obtained for all loading states of the vehicle. In addition, the proposed method permits the use of a smaller compressed air store than controlling methods with fixedly defined nominal air quantity values and air quantity tolerance bands, and this leads to cost advantages in the production of a level control system of said type.

LIST OF REFERENCE SYMBOLS

AL Axle load
BZ Loading state of the vehicle
HN High level, distance from body to underlying surface
LG Empty weight MG Maximum weight
NN Normal level, distance from body to underlying surface
TN Low level, distance from body to underlying surface
P Pneumatic spring pressure
PV System air quantity
PV_MIN Minimum system air quantity value
PV_SOLL Nominal system air quantity value
PV_MAX Maximum system air quantity value
PV_UG Upper limit value of the tolerance band
PV_OG Lower limit value of the tolerance band
TL Air quantity tolerance band

The invention claimed is:

1. A method for air quantity control in a closed pneumatic spring system in a vehicle, in which method a compressed air pump supplies at least two pneumatic springs and/or a compressed air store on demand with an air quantity of such a magnitude that a high air pressure prevails in the respective pneumatic spring and/or in the compressed air store such that a vehicle body which is supported on the pneumatic spring is at a desired distance from the underlying surface or from the vehicle axle, the method comprising the steps of
    measuring a pneumatic spring pressure (P) in at least two of the pneumatic springs,
    determining the distance (HN, NN, TN) between the vehicle body and the underlying surface or the vehicle axle,
    determining an axle load (AL) of a vehicle axle from the pneumatic spring pressure (P) and the distance (HN, NN, TN) from the vehicle body to the underlying surface or to the vehicle axle,
    determining a nominal system air quantity value (PV_SOLL) as a function of the axle load (AL), and
    adjusting an actual system air quantity to said nominal system air quantity value (PV_SOLL) by actuating the compressed air pump to increase the actual system air quantity or by actuating a relief valve to reduce the actual system air quantity.

2. The method as claimed in claim 1, wherein the respective nominal system air quantity value (PV_SOLL) is assigned an air quantity tolerance band (TL) whose upper tolerance band limit value (P_OG) does not exceed a predetermined maximum system air quantity value (PV_MAX), and whose lower tolerance band limit value (P_UG) does not fall below a predetermined minimum system air quantity value (PV_MIN).

3. The method as claimed in claim 2, wherein the difference between the nominal system air quantity value (PV_SOLL) and the upper tolerance band limit value (P_OG) and the difference between the nominal system air quantity value (PV_SOLL) and the lower tolerance band limit value (P_UG) can be of different magnitude.

4. The method as claimed in claim 2, wherein the nominal system air quantity value (PV_SOLL) coincides with one of the tolerance band limit values (P_OG, P_UG).

5. The method as claimed in claim 2, wherein the nominal system air quantity value (PV_SOLL) corresponds to the maximum system air quantity value (PV_MAX) or the minimum system air quantity value (PV_MIN).

6. The method as claimed in claim 2, wherein the maximum system air quantity value (PV_MAX), the minimum system air quantity value (PV_MIN) and the upper and lower tolerance band limit values (P_OG, P_UG) are selected such that the controlling speed is higher than a defined speed limit value in all level change processes which occur during operation.

7. The method as claimed in claim 2, wherein the maximum system air quantity value (PV_MAX), the minimum system air quantity value (PV_MIN) and the upper and lower tolerance band limit values (P_OG, P_UG) are selected such that a maximum permitted electrical current of the compresses air is not exceeded in any level change processed which occur during operation.

8. The method as claimed in claim 2, wherein the maximum system air quantity value (PV_MAX), the minimum system air quantity value (PV_MIN) and the upper and lower tolerance band limit values (P_OG, P_UG) are selected such that the pressure in the compressed air store does not fall below a predetermined minimum value and the pressure in the compressed air store does not exceed a maximum predetermined value in any level change processes which occur during operation.

9. The method as claimed in claim 2, wherein the nominal system air quantity value (PV_SOLL) and the limit values (P_OG, P_UG) of the air quantity tolerance band (TL) are determined while the vehicle is at rest.

10. The method as claimed in claim 1, wherein the air quantity control is applied to the pneumatic springs of at least two vehicle axles.

11. The method as claimed in claim 1, wherein the air quantity control is applied to the pneumatic springs of a rear vehicle axle.

* * * * *